(12) United States Patent
Yao

(10) Patent No.: US 8,464,297 B2
(45) Date of Patent: Jun. 11, 2013

(54) APPARATUS, SYSTEMS AND METHODS FOR IDENTIFYING A VIDEO OF INTEREST USING A PORTABLE ELECTRONIC DEVICE

(75) Inventor: Kevin Yao, Cheyenne, WY (US)

(73) Assignee: EchoStar Broadcasting Corporation, Englewood, CO (US)

( * ) Notice: Subject to any disclaimer, the term of this patent is extended or adjusted under 35 U.S.C. 154(b) by 241 days.

(21) Appl. No.: 12/821,348

(22) Filed: Jun. 23, 2010

(65) Prior Publication Data

US 2011/0321103 A1    Dec. 29, 2011

(51) Int. Cl.
*H04N 7/173* (2011.01)
(52) U.S. Cl.
USPC ................................ 725/87; 725/60; 348/734
(58) Field of Classification Search
USPC .......................... 725/87–118, 60, 61; 348/734
See application file for complete search history.

(56) References Cited

U.S. PATENT DOCUMENTS

| 5,918,213 | A | 6/1999 | Bernard et al. | |
|---|---|---|---|---|
| 6,956,833 | B1 * | 10/2005 | Yukie et al. | 370/328 |
| 7,013,290 | B2 | 3/2006 | Ananian | |
| 7,257,202 | B2 * | 8/2007 | Umemura et al. | 379/88.14 |
| 7,773,808 | B2 * | 8/2010 | Lim et al. | 382/181 |
| 8,038,060 | B2 * | 10/2011 | Tani et al. | 235/383 |
| 2002/0187774 | A1 | 12/2002 | Ritter et al. | |
| 2006/0240862 | A1 | 10/2006 | Neven et al. | |
| 2007/0198432 | A1 | 8/2007 | Pitroda et al. | |
| 2009/0240735 | A1 | 9/2009 | Grandhi et al. | |

* cited by examiner

*Primary Examiner* — Annan Shang
(74) *Attorney, Agent, or Firm* — Lowe Graham Jones PLLC

(57) ABSTRACT

Systems and methods are operable to identify videos of interest using information acquired by a portable electronic device. An exemplary embodiment receives the acquired information pertaining to a video of interest, wherein the acquired information was acquired by the portable electronic device; determines an identity of the video of interest based upon the acquired information; and communicates the video of interest to a media device.

20 Claims, 3 Drawing Sheets

APPARATUS, SYSTEMS AND METHODS FOR IDENTIFYING A VIDEO OF INTEREST USING A PORTABLE ELECTRONIC DEVICE

BACKGROUND

On occasion, a client may wish to rent and/or purchase a video at an outlet location, such as a movie rental boutique, store, or the like. The video of interest may not always be available, particularly if the video is popular and/or is a new release.

In other situations, the client may only be at the video outlet location to rent or purchase a single video or a limited number of videos, such as when they have a coupon or the like. However, the client may see several videos of interest that the client may wish to rent and/or purchase at a later time. Further, the client may wish to review supplemental information of interest pertaining to the videos of interest before making their decision to rent and/or purchase.

In other situations, the client may not even be looking to rent and/or purchase any particular video. For example, they may be shopping in a grocery store or in a shopping mall where there are video rental and/or sale outlets. The client may see one or more videos of interest that the client may wish to rent and/or purchase at a later time. Or, the client may simply wish to review supplemental information of interest pertaining to the videos of interest.

Accordingly, there is a need in the arts to provide a more client friendly system and method for accessing videos of interest for rent and/or purchase. Further, there is a need in the arts to provide a more client friendly system and method for obtaining supplemental information pertaining to the videos of interest.

SUMMARY

Systems and methods of identifying videos of interest using information acquired by a portable electronic device are disclosed. An exemplary embodiment receives the acquired information pertaining to a video of interest, wherein the acquired information was acquired by the portable electronic device; determines an identity of the video of interest based upon the acquired information; and communicates the video of interest to a media device.

BRIEF DESCRIPTION OF THE DRAWINGS

Preferred and alternative embodiments are described in detail below with reference to the following drawings.

DETAILED DESCRIPTION

Figure 1:
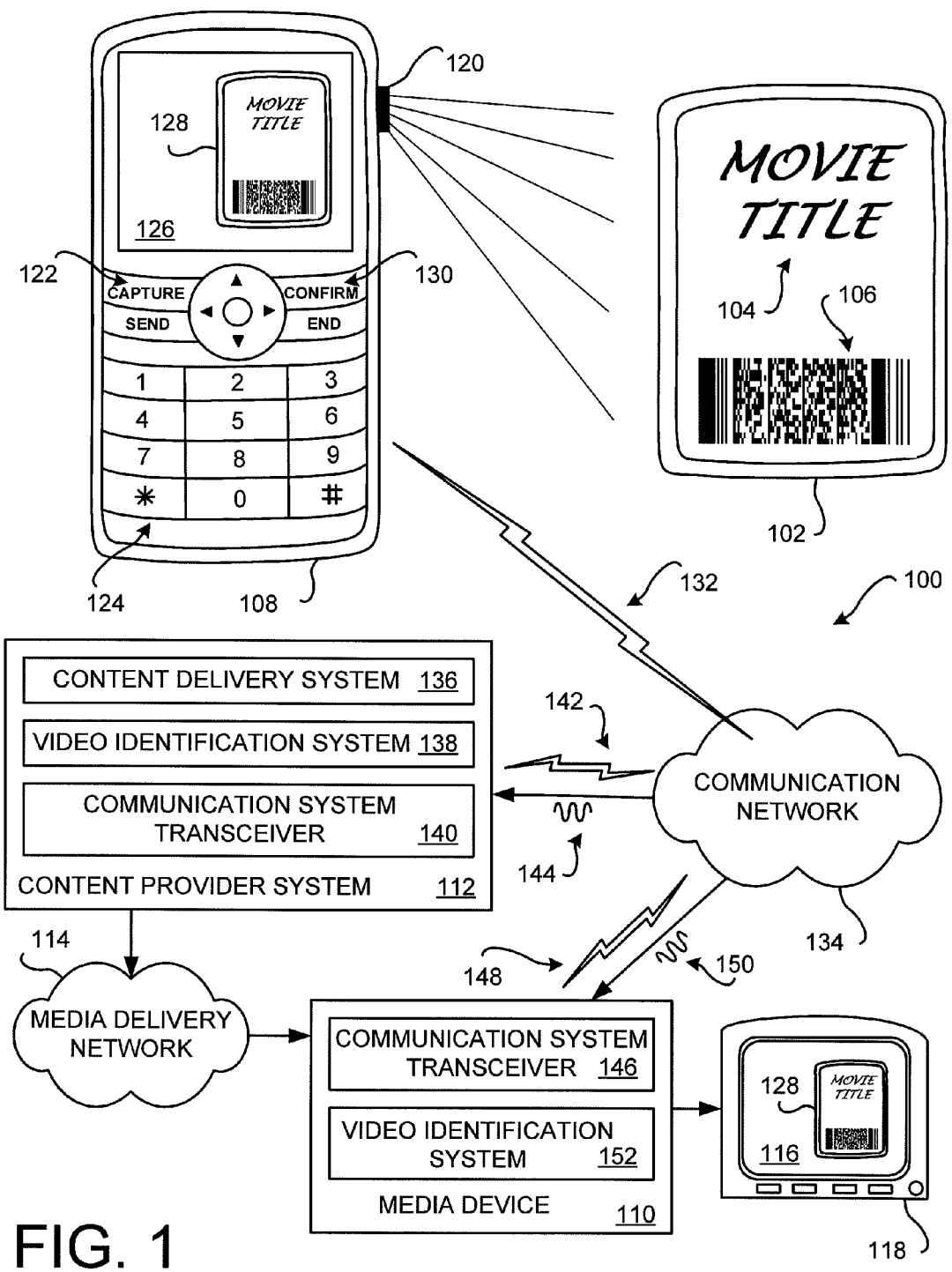
FIG. 1 is a block diagram of an embodiment of a video information and acquisition system.

FIG. 1 is a block diagram of an embodiment of a video information and acquisition system 100. In situations where one or more videos of interest are not available for rent and/or purchase, or if the user simply wishes to obtain supplemental information pertaining to the videos of interest, embodiments of the video information and acquisition system 100 are configured to allow the user to later rent and/or purchase, or obtain supplemental information, for one or more videos of interest.

Often, there is a video box, a display box, a poster, or other advertising media 102 that indicates the title 104 of the video of interest and/or shows a bar code identifier 106 of the video of interest. Non-limiting examples of the bar code identifier 106 include a universal product code (UPC) code or a European article number (EAN) code.

Embodiments of the video information and acquisition system 100 are configured to allow the user to capture an image of the title 104 and/or the bar code identifier 106 using a portable electronic device 108. Alternatively, or additionally, embodiments may be configured to allow the user to scan the title 104 and/or the bar code identifier 106. Additionally, or alternatively, the user may manually key in the title and/or the numbers of the bar code identifier using the buttons on their portable electronic device 108. Further, embodiments may be configured to receive voice information from the user, such as a spoken title or the bar code numbers.

Embodiments of the portable electronic device 108 may be a cellular telephone, personal device assistant (PDA), an internet and multimedia enabled smart phone, or other portable electronic device. Some embodiments of the portable electronic device 108 may include a specialty device, such as a hand held scanner or camera. Captured image information, scanned information, entered text information, and/or spoken information is communicated from or is downloaded from the portable electronic device 108 to another device that processes the received information to identify the video of interest.

Based on the title 104 and/or the bar code identifier 106, embodiments of the video information and acquisition system 100 are configured to provide the video of interest for rental and/or purchase, provide a schedule of availability of the video of interest, and/or provide supplemental information pertaining to the video of interest, at the user's media device 110. The user's media device 110 may be located at their residence, office, or other location.

The media device 110 is configured to receive media content from a content provider system 112. Media content is delivered to the user's media device 110 via a media delivery network 114. Non-limiting examples of the media delivery network 114 include a satellite system, an over-the-air terrestrial system, a cable system, a fiber optics system, and/or the Internet. The delivered media content, which may also include the video of interest and/or the supplemental information, is presented on a display 116 of a media presentation device 118. Non-limiting examples of the media presentation device 118 include a television, a personal computer, a monitor, or the like.

The portable electronic device 108 includes an image capture device 120 that is configured to capture an image of the title 104 of the video of interest and/or the bar code identifier 106. The image capture device 120 may be a camera or the like. Alternatively, or additionally, the image capture device 120 may be a scanner that is configured to scan the title 104 and/or the bar code identifier 106.

In the various embodiments, the user acquires image information of the title 104 and/or the bar code identifier 106 using their portable electronic device 108. The video of interest may be identified in several manners. When a captured image is provided, an exemplary embodiment identifies the video of interest based on the title 104 using a character recognition algorithm. When scanned information is provided, the title 104 may be identified based on the scanned image of the title 104. Alternatively, or additionally, the video of interest may be identified based on a captured image and/or scanned information of the bar code identifier 106 using a bar code recognition algorithm. When voice audio information is received, the title 104 and/or the bar code identifier 106 may be determined using an audio recognition algorithm. Alternatively, or additionally, audio information may include a sound clip or a dialogue track of the video of interest. For example, a particularly well know song or a well known phrase may be used to identify the video of interest. When keyed in textual information is used, the title 104 and/or the bar code identifier 106 may be determined from the received text information.

The exemplary portable electronic device 108 is illustrated as a cellular phone, which typically has an onboard camera (the image capture device 120), a microphone (not shown), and a plurality of key buttons 124 for specifying text or numbers. The user captures an image of the title 104 and/or the bar code identifier 106 by orienting the camera towards the video display box, poster, or other advertising media 102. An image capture button 122 or the like on the surface of the portable electronic device 108 is actuated by the user to acquire the image information pertaining to the video of interest. Some embodiments of the portable electronic device 108 include a display 126 thereon where an image 128 of the acquired information may be presented to the user for verification.

If the user is satisfied with the image of the display box, poster, or other advertising media 102, they may actuate a confirm button 130 (or another button depending upon the configuration of the portable electronic device 108) to transmit and/or save the acquired captured image information pertaining to the video of interest. If the acquired captured image information pertaining to the video of interest is saved, it can be downloaded to another device at a later time. Acquired scanned information, audio information, and/or keyed in textual information may be similarly transmitted and/or saved.

When embodiments of the portable electronic device 108 are operable to communicate over a wireless cellular telephone system and/or a wireless Internet enabled system, the acquired information pertaining to the video of interest may be communicated via a wireless signal upon actuation of the confirm button 130. The acquired information is communicated as a wireless signal 132 to a communication network 134. For example, if the portable electronic device 108 is operable to communicate over a wireless cellular-based communication network 134, the communication network 134 may include a suitable wireless transceiver that is configured to receive the wireless signal 132. Alternatively, or additionally, if the portable electronic device 108 is operable to communicate over a wireless Internet enabled system, a suitable modem, WiFi station, or other suitable wireless local area network (WLAN) may be configured to receive the wireless signal 132. Alternatively, or additionally, the portable electronic device 108 may be later coupled to a wire based system (not shown) that downloads the previously saved information pertaining to the video of interest to the communication network 134 using an e-mail message, another electronic messaging system, a browser, or the like.

The acquired information pertaining to the video of interest, in some embodiments, is then communicated over the communication network 134 to the content provider system 112. The content provider system 112 comprises a content delivery system 136, a video identification system 138, and a communication network transceiver 140. The communication network transceiver 140 communicatively couples the content provider system 112 and the communication network 134. Depending upon how the content provider system 112 is communicatively coupled to the communication network 134, the acquired information pertaining to the video of interest is received using a suitable wireless signal 142 or a suitable wire-based signal 144. Some embodiments of the content provider system 112 may be configured to transmit a confirmation message back to the portable electronic device 108 to confirm receipt of the acquired information pertaining to the video of interest.

The video identification system 138 processes the received information pertaining to the video of interest acquired by the portable electronic device 108 to identify the video of interest. The identification may be based on the title 104 and/or the bar code identifier 106. When captured image information is provided, the title 104 and/or the bar code identifier 106 may be determined using character recognition logic. When scanned information is provided, the title 104 and/or the bar code identifier 106 may be determined using scanned bar code recognition logic to identify the numerical information of the bar code identifier 106. When audio information is provided, the title 104 and/or the bar code identifier 106 may be determined using voice recognition logic. When keyed in textual information is provided, the title 104 and/or the bar code identifier 106 may be determined using the received text information.

If the video of interest is available from the content provider, the video of interest may then be made available in a variety of manners. In an exemplary embodiment, the video of interest is communicated from the content provider system 112 over the media delivery network 114 to the user's media device 110 and is optionally stored. The video of interest may be provided from a video on demand system for presentation to the user at their convenience. Alternatively, or additionally, a copy of the video of interest may be mailed to the user.

Some embodiments of the media device 110 are alternatively, or additionally, configured to receive the information pertaining to the video of interest from the portable electronic device 108. Such embodiments may include a communication system transceiver 146 configured to receive a wireless signal 148, such as a cellular telephone call, having the acquired information. Alternatively, or additionally, the communication system transceiver 146 may be configured to receive a suitable wire-based signal 150. Some embodiments of the media device 110 may be configured to transmit a confirmation message back to the portable electronic device 108 to confirm receipt of the acquired information pertaining to the video of interest.

Some embodiments of the media device 110 may further include a video identification system 152. The video identification system 152 processes the received information pertaining to the video of interest acquired by the portable electronic device 108 to identify the video of interest. The identification may be based on the title 104 and/or the bar code identifier 106 using character recognition logic, bar code scanning logic, voice recognition logic, or the like.

The video of interest, at some time that is convenient for the user, may be presented on the display 116 of the media presentation device 118. In some embodiments, the image 128 of the acquired information may be presented on the display 116 for verification by the user.

Figure 2:
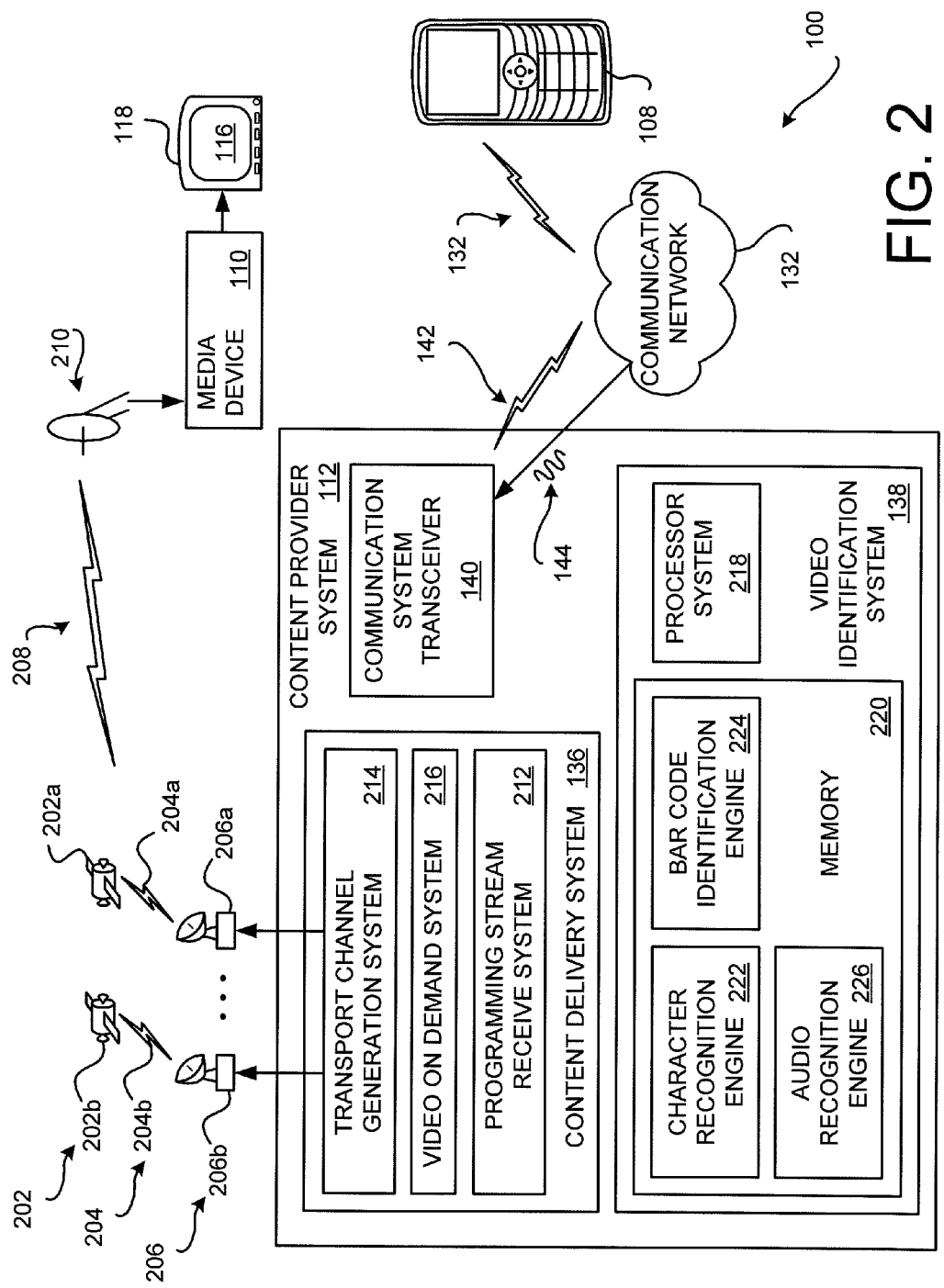
FIG. 2 is a block diagram of an embodiment of the video information and acquisition system implemented at a content provider system.

FIG. 2 is a block diagram of an embodiment of the video information and acquisition system 100 implemented at the content provider system 112. The exemplary content provider system 112 is configured to provide media content to a plurality of media devices 110. Further, the content provider system 112 may be configured to provide the identified video of interest to the particular media device 110 that is associated with the user who originally acquired the information pertaining to the video of interest using their portable electronic device 108.

The exemplary content provider system 112 provides media content to the plurality of media devices 110 using a plurality of satellites 202. Each of the satellites 202 receive uplinked transport channels 204 from a satellite antenna 206. The uplinked transport channels 204 comprise a plurality of multiplexed content streams. Satellite signals 208 are communicated down to a receiving antenna 210. The received satellite signals 208 are received and processed at the media device.

For example, the illustrated media device 110 and its associated antenna 142 may be located in a geographic region serviced by the satellite 202*a*. Here, the satellite antenna 206*a* uplinks the transport channel 204*a* to the satellite 110*a*. Media content received at the media device 110 may then be presented on the display 116 of the media presentation device 118.

The content delivery system 136 comprises a programming stream receive system 212, an optional transport channel generation system 214, and an optional video on demand (VOD) system 216. The programming stream receive system 212 is configured to receive a plurality of media content streams from a variety of content providers. Non-limiting examples of the content providers include national broadcasting networks, local affiliated broadcast stations, specialty program providers, news channel providers, premium movie channel providers, sports networks, etc. The media content streams may be received in any suitable manner. The optional transport channel generation system 214 generates the uplink transport channels 204 from selected ones of the media content streams provided by the programming stream receive system 212.

The optional VOD system 216 stores selected media content for later delivery to customers. Some of the media content available from the VOD system 216 may require a premium for delivery and/or access. Other media content stored in the VOD system 216 may be freely available to the user as part of a service agreement or the like with the media content provider. In a satellite-based content system, authorization codes or the like are provided to the media device 110 so that the user may have access to the media content available from the VOD system 216.

Alternative embodiments may provide media content to the plurality of media devices 110 using an alternative system. For example, the content provider system 112 may employ a cable system (in conjunction with other types of media communication networks). In such systems, the media content is provided to a local area content provider system 112 using a high capacity communication system, such as a fiber optics network or the like. Then, individual media devices 110 receive media content over a coaxial cable network that is transmitted from the local area content provider system 112. Some embodiments of the video information and acquisition system 100 implemented in a cable delivery system may directly provide selected media content available from the VOD system 216 to a particular media device 110.

The video identification system 138 comprises a processor system 218 and/or a memory 220. A character recognition engine 222, a bar code identification engine 224, and an audio recognition engine 226 reside in the memory 220. The character recognition engine 222, when retrieved and executed by the processor system 218, identifies the title 104 using any suitable character recognition logic configured to identify information from captured image information, scanned information, and/or keyed in textual information. The video of interest can then be identified using the title 104 and/or by the numerical information of the bar code identifier 106. Alternatively, or additionally, the bar code identification engine 224, when retrieved and executed by the processor system 218, identifies the numerical information of the bar code identifier 106 from captured image information, scanned information, and/or keyed in textual information. Alternatively, or additionally, the audio recognition engine 226, when retrieved and executed by the processor system 218, identifies the title 104 using any suitable voice, music, and/or dialog recognition logic configured to identify information from received audio information. The character recognition engine 222, the bar code identification engine 224, and/or the audio recognition engine 226, in some embodiments, are integrated together and/or may be integrated with other logic (not shown).

Additionally, the identified video of interest is associated with the particular user, the particular portable electronic device 108 used by the user, and/or a particular media device 110 operated by the user. For example, the acquired information may include a unique user identifier that identifies or is otherwise associated with a particular user. The user identifier may be a cell phone number, SIM card number, serial number, or the like of the portable electronic device 108. Alternatively, or additionally, the acquired information received from the portable electronic device 108 may include a special identifier, such as the name of the user, a user's account information, or an identifier of the media device 110 that associated with the user and/or the portable electronic device 108.

In situations where the video of interest is currently scheduled for presentation, embodiments of the video information and acquisition system 100 may provide a notice to the user's media device 110 indicating the pertinent schedule information and/or the related information of interest. In embodiments where the video of interest is presently available from the VOD system 216, a notification may be sent regarding the availability of the video of interest. The notification may be a pop up window or the like. The user may then access the video of interest from the VOD system 216 at their convenience.

If the video of interest is a pay-for-view type of video, the user may be billed for the video of interest. Alternatively, the user may be requested to make payment. Upon payment, if required, the video of interest can be communicated to the user's media device 110 for presentation or storage at the user's media device 110 or another connected video storage device.

It is appreciated that the components and systems of the content provider system 112 are described in overview to facilitate a conceptual explanation of various embodiments of the video information and acquisition system 100. Accordingly, the content provider system 112 may include other components and/or systems that are not described herein.

Figure 3:
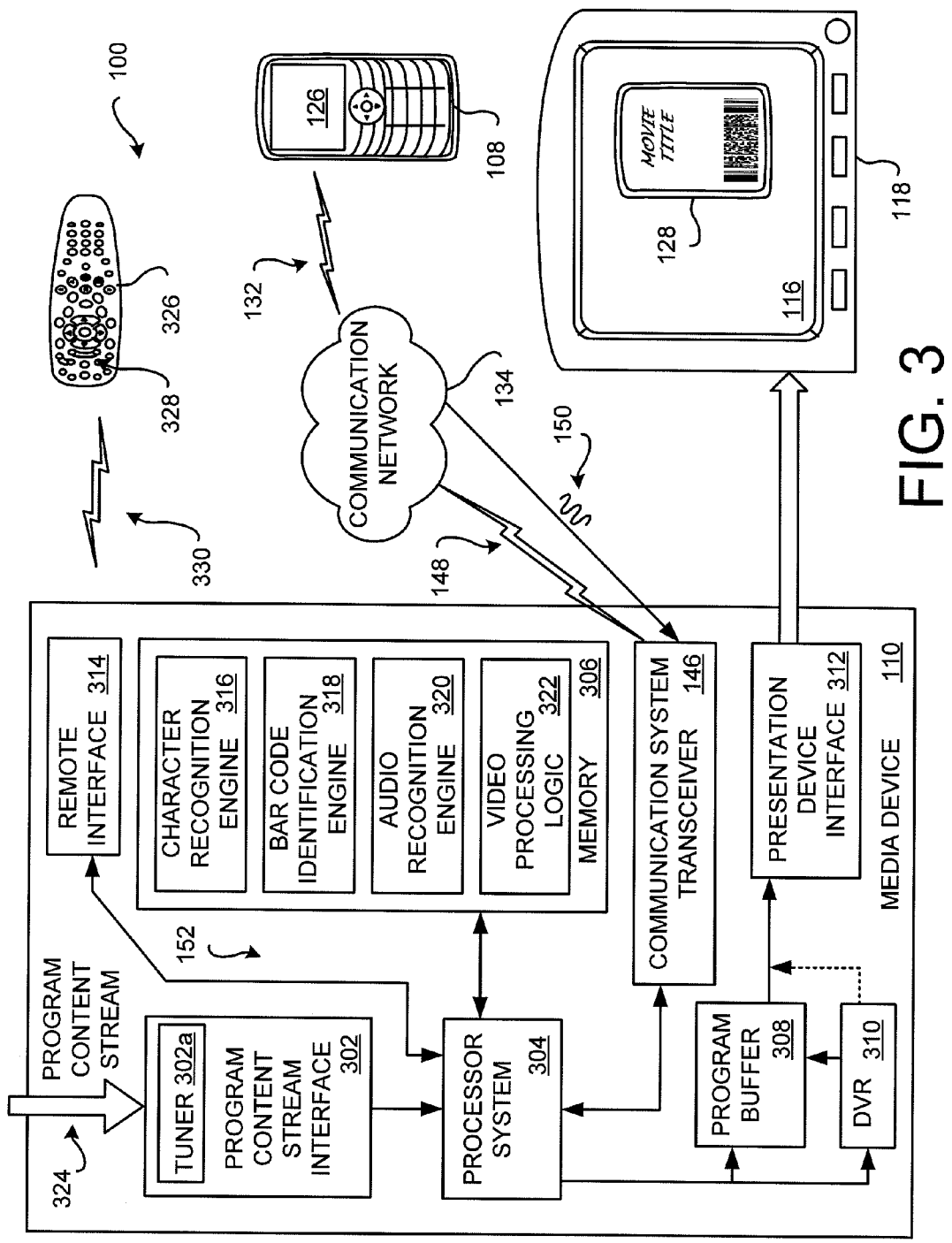
FIG. 3 is a block diagram of an embodiment of the video information and acquisition system implemented at a media device.

FIG. 3 is a block diagram of an embodiment of the video information and acquisition system 100 implemented at a media device 110. Embodiments of the video information and acquisition system 100 may be implemented in other media devices, such as, but not limited to, televisions (TVs), personal device assistants (PDAs), game playing devices, or personal computers (PCs).

The non-limiting exemplary media device 110 comprises a program content stream interface 302, a processor system 304, a memory 306, a program buffer 308, an optional digital video recorder (DVR) 310, a presentation device interface 312, a remote interface 314, and the optional communication system transceiver 146. The memory 306 comprises portions for storing a character recognition engine 316, a bar code identification engine 318, an audio recognition engine 320, and a video processing logic 322. In some embodiments, the character recognition engine 316, the bar code identification engine 318, the audio recognition engine 320, and/or the video processing logic 322 may be integrated together, and/or may be integrated with other logic. Other media devices 110 may include some, or may omit some, of the above-described media processing components. Further, additional components not described herein may be included in alternative embodiments.

Generally, the video identification system 152 is comprised of the processor system 304, the character recognition engine 316, the bar code identification engine 318, and/or the audio recognition engine 320. Here, the processor system 304 performs other media processing functions, such as when executing the video processing logic 322. Further, other logic and information may reside in the memory 306. However, in alternative embodiments, the processor system 304 and/or the memory 306 with the character recognition engine 316, the bar code identification engine 318, and/or the audio recognition engine 320 may be separately implemented as a dedicated processor system and/or memory, respectively.

The functionality of the media device 110, here a set top box, is now broadly described. A media content provider provides program content that is received in one or more multiple program content streams 324 multiplexed together in one or more transport channels. The transport channels with the program content streams 324 are communicated to the media device 110 from the content provider system 112 operated by the media content provider.

The one or more program content streams 324 are received by the program content stream interface 302. One or more tuners 302a in the program content stream interface 302 selectively tune to one of the program content streams 324 in accordance with instructions received from the processor system 304. The processor system 304, executing the video processing logic 322 and based upon a request for a program of interest specified by a user, parses out program content associated with the program of interest. The program of interest is then assembled into a stream of video and/or audio information which may be stored by the program buffer 308 such that the program content can be streamed out to the media presentation device, such as the media presentation device 118, via the presentation device interface 312. Alternatively, or additionally, the parsed out program content may be saved into the DVR 310 for later presentation.

The exemplary media device 110 is configured to receive commands from the user via a remote control 326. The remote control 326 includes one or more controllers 328, such as buttons or the like. The user, by actuating one or more of the controllers 328, causes the remote control 326 to generate and transmit commands, via a wireless signal 330, to the media device 110. The commands control the media device 110 and/or control the media presentation device 118. The wireless signal 330 may be an infrared signal or an RF signal.

As described herein, embodiments of the video information and acquisition system 100 are configured to operate the media device 110 so that after identification of the video of interest, the user will be provided the video of interest and/or receive a notification of a scheduled presentation of the video of interest. In an exemplary embodiment, the notification may be a pop up window or the like. For example, if the video of interest is available in the VOD system 216 (FIG. 2) at the content provider system 112, the video of interest may be downloaded to the DVR 310. Alternatively, or additionally, a notification may be presented on the display 116 of the media presentation device 118, and/or on the display 126 of the user's portable electronic device 108, indicating availability of the video of interest from the VOD system 216.

If the video of interest is a pay-for-view type program, the user can pay and/or be billed for the access to the video of interest. Some embodiments, before billing, request an authorization and/or verification from the user. In an exemplary embodiment, a pop up notification is presented to the user when the media device 110 is operating. The authorization and/or verification can be processed through the media device 110 at any suitable time, and/or may be processed at the portable electronic device 108. For example, but not limited to, the authorization and/or verification can be performed at the time that the user uses their portable electronic device 108 to acquire the information that is used to identify the video of interest.

Some embodiments of the media device 110 are configured to receive the acquired information that is used to identify the video of interest. For example, acquired image information of the video of interest may be received via a suitable wireless signal 148 or wire-based signal 150, and stored in the memory 306. The image 128 of the acquired information may be presented to the user on the display 116 for verification. Additionally, or alternatively, supplemental information of interest may be provided by the content provider system 112 and presented on the display 116. For example, information from an electronic program guide data base may be retrieved and presented to the user.

In some applications, the media delivery network 114 and communication network 134 may be integrated together or be the same network. For example, a coaxial cable system may be configured to provide telephony services and various media content to the user. For example, the user might use their portable electronic device 108 to call another person at the location where the media device 110 is installed. The same network could deliver the acquired image information for the video of interest to the media device 110, and at a later time, provide the video of interest to the media device 110.

It should be emphasized that the above-described embodiments of the video information and acquisition system 100 are merely possible examples of implementations of the invention. Many variations and modifications may be made to the above-described embodiments. All such modifications and variations are intended to be included herein within the scope of this disclosure and protected by the following claims.

The invention claimed is:

1. A method to identify videos of interest using information acquired by a portable electronic device, the method comprising:
receiving the acquired information pertaining to a captured image of a title of a video of interest, wherein the acquired captured image information was acquired by the portable electronic device;
determining an identity of the video of interest based upon the acquired captured image information, wherein the identity of the video of interest is determined using a character recognition engine that is configured to determine the title of the video of interest based on textual information of the title in the captured image; and
communicating the video of interest to a media device.

2. The method of claim 1, wherein receiving the acquired information from the portable electronic device comprises:
receiving the acquired information from a cellular-based communication network, wherein the acquired information was communicated using a wireless signal transmitted from the portable electronic device to the cellular-based communication network.

3. The method of claim 1, wherein receiving the acquired information from the portable electronic device comprises:
  receiving a captured image with the textual information of the title of the video of interest;
  identifying the textual information of the title of the video of interest in the received captured image using the character recognition engine that is configured to determine the title of the video of interest; and
  determining the title of the video of interest based on the identified textual information.

4. The method of claim 1, wherein receiving the acquired information from the portable electronic device comprises:
  receiving a captured image of a bar code associated with the video of interest, wherein the identity of the video of interest is determined using the character recognition engine that is configured to determine the numbers of the bar code identifier.

5. The method of claim 1, wherein receiving the acquired information from the portable electronic device comprises:
  receiving a scanned bar code, wherein the identity of the video of interest is determined using a bar code identification engine that is configured to determine the numbers of the bar code identifier.

6. The method of claim 1, wherein receiving the acquired information from the portable electronic device comprises:
  receiving audio information corresponding to a title of the video of interest, wherein the identity of the video of interest is determined using a voice recognition engine that is configured to determine the title of the video of interest.

7. The method of claim 1, wherein communicating the video of interest to a media device comprises:
  retrieving the video of interest from a video on demand system.

8. The method of claim 7, wherein the video of interest is a pay-for-view video, and wherein communicating the video of interest to a media device comprises:
  communicating a payment notification to the media device; and
  receiving the authorization of a payment for the pay-for-view video,
  wherein the video of interest is communicated in response to receiving the authorization of the payment for the pay-for-view video.

9. The method of claim 8, wherein receiving the authorization of the payment for the pay-for-view video comprises:
  receiving the authorization of the payment for the pay-for-view video from the portable electronic device.

10. The method of claim 1, further comprising:
  communicating a notification to the media device, wherein the notification includes information pertaining to a scheduled presentation of the video of interest.

11. The method of claim 1, further comprising:
  communicating the captured image to the media device.

12. A media device configured to present videos of interest identified based on information acquired by a portable electronic device, comprising:
  a program content stream interface coupled to a media delivery network, and configured to receive a plurality of program content streams from a content provider system;
  a memory configured to store a character recognition engine;
  a communication system transceiver configured to receive captured image information acquired by the portable electronic device, wherein the received captured image information includes at least textual information of a title of a video of interest;
  a processor system communicatively coupled to the program content stream interface, the memory and the communication system transceiver, wherein the processor is configured to execute the character recognition engine to identify the video of interest based on the recognized textual information in the captured image; and
  a presentation device interface configured to communicate at least one of the program content streams corresponding to the video of interest to a media presentation device,
  wherein the video of interest is identified based on captured image information acquired by the portable electronic device.

13. The media device of claim 12,
  wherein the video of interest is retrieved from a video on demand system.

14. The media device of claim 12,
  wherein the memory communicatively coupled to the processor system is further configured to store a bar code identification engine,
  wherein the communication system transceiver communicatively coupled to the processor system is further configured to receive scanned bar code information acquired by the portable electronic device,
  wherein the processor system is further configured to execute the bar code identification engine to identify the video of interest based on a number of the bar code identifier, and
  wherein the video of interest is retrieved from a video on demand system.

15. A method to identify videos of interest using captured image information acquired by a portable electronic device, the method comprising:
  receiving at a media device the acquired captured image information pertaining to a video of interest, wherein the acquired captured image information was acquired by the portable electronic device and includes textual information of the title of the video of interest; and
  determining an identity of the video of interest based upon the textual information in the acquired captured image information.

16. The method of claim 15, wherein the identity of the video of interest is determined using a character recognition engine that is configured to determine the title of the video of interest based upon recognition of the textual information in the acquired captured image information.

17. The method of claim 16, further comprising:
  communicating the captured image to a presentation device, wherein the presentation device is configured to present the captured image on a display.

18. The method of claim 15, wherein receiving the acquired information from the portable electronic device comprises:
  receiving a captured image of a bar code associated with the video of interest, wherein the identity of the video of interest is determined using a character recognition engine that is configured to determine the numbers of the bar code identifier.

19. The method of claim 15, wherein receiving the acquired information from the portable electronic device comprises:
  receiving a scanned bar code, wherein the identity of the video of interest is determined using a bar code identification engine that is configured to determine the numbers of the bar code identifier.

20. The method of claim 15, further comprising:
retrieving the video of interest from a video on demand system.

* * * * *